United States Patent [19]
Pengilly et al.

[11] 4,185,046
[45] Jan. 22, 1980

[54] FLAME RETARDANT COPOLYESTER ADHESIVE

[75] Inventors: Brian W. Pengilly, Akron, Ohio; Maneung Hahn, Cumberland, R.I.

[73] Assignee: The Goodyear Tire & Rubber Company, Akron, Ohio

[21] Appl. No.: 826,005

[22] Filed: Aug. 19, 1977

[51] Int. Cl.² ............................................. C08L 67/00
[52] U.S. Cl. .................... 525/444; 156/332; 260/32.8 R; 260/45.85 P; 260/DIG. 24; 428/458; 428/480; 428/481
[58] Field of Search .............. 260/75 H, 860, 45.85 P, 260/DIG. 24; 156/332

[56] References Cited

U.S. PATENT DOCUMENTS

| | | | |
|---|---|---|---|
| 3,372,148 | 3/1968 | Weiner | 260/75 R |
| 3,915,926 | 10/1975 | Wambach | 260/860 X |
| 3,960,806 | 6/1976 | Najour et al. | 260/75 H X |

*Primary Examiner*—Theodore E. Pertilla
*Attorney, Agent, or Firm*—John P. Ward

[57] ABSTRACT

Substrates such as polyethylene terephthalate copolymers are treated with polyester adhesives containing flame retardant polymers. The adhesive/polyethylene terephthalate composite possesses improved resistance to combustion.

3 Claims, No Drawings

FLAME RETARDANT COPOLYESTER ADHESIVE

This invention relates to a flame retardant copolyester adhesive. More particularly it relates to a copolyester adhesive which can be used to coat polyester film and other flammable substrates and act as a flame retardant for both itself and the polyester film/adhesive composite.

Polyester films have various uses, including use as wrappings for electrical wire. Copolyester resins are known as adhesives for these polyester films (see U.S. Pat. No. 3,372,148). In such applications it is sometimes desirable that the film, the adhesive, and/or composition to which the film is adhered, be flame retardant.

It is an object of the present invention to provide a copolyester adhesive which is flame retardant. It is another object to provide an adhesive/polyester film composite which is flame retardant. It is also an object to provide a process for making a flame retardant adhesive/polyester film composite. It is still another object to improve the flame resistance of compositions adhered together with a copolyester adhesive. Other objects will become apparent as the description proceeds.

Some of the objects of the present invention are accomplished by the preparation of an adhesive comprised of a copolyester adhesive resin and a flame retardant polymer. The combination can be prepared by dissolving both the resin and flame retardant polymer in an inert organic solvent.

Other objects are accomplished by treating the surface of a substrate with the copolyester resin flame retardant combination described above. This is normally accomplished by treating the substrate with a solution of the resin and the flame retardant polymer in an inert organic solvent and allowing the solvent to evaporate therefrom, thereby forming a layer of the copolyester resin/flame retardant polymer on the surface of the substrate. The copolyester/flame retardant polymer combination provides flame retardant protection for both the coated substrate and any compositions to which the substrate is adhered.

The polyester adhesive resin is represented by the resin described in U.S. Pat. No. 3,372,148, the contents of said patent being incorporated herein by reference. More broadly, the copolyester adhesive resin is represented by a copolyester containing glycol and acid units, the glycol units being comprised of ethylene glycol units and at least one other glycol unit, preferably a glycol unit selected from the group consisting of cyclohexanedimethylol units, neopentyl glycol units, tetramethylene glycol units, hexamethylene glycol units and 1,3-propylene glycol units and the acid units being comprised of terephthalic acid units and at least one other dicarboxylic acid unit, preferably an acid unit selected from the group consisting of isophthalic acid units, phthalic acid units, adipic acid units, azelaic acid units, sebacic acid units, glutaric acid units, and cyclohexane dicarboxylic acid units, with the proviso that the glycol portion of the polyester resin contains from 25 mole percent to 100 mole percent of ethylene glycol units and the acid portion of the polyester resin contains 25 mole percent to 100 mole percent, preferably 25 to 75 percent, of terephthalic acid units.

The terms "glycol unit" and "acid unit" are used herein as defined in U.S. Pat. No. 3,372,148 (see column 2, lines 46-49).

It is preferred that the glass transition temperature of the copolyester adhesive resin as measured by a differential scanning calorimeter is less than 70 degrees C. and preferably less than 50 degrees C.

These polyester adhesive resins can be prepared by any of the conventional methods used in preparing polyesters, for example, see U.S. Pat. No. 3,372,148.

The flame retardant polymer is preferably a bromine-containing polyester represented by polymers prepared from 2,2'-bis[4-(2-hydroxyethoxy)-3,5-dibromophenyl] propane and dibasic acids having the structure $R(COOH)_2$ wherein R is an alkylene radical having 4 to 10, preferably 4 to 7 carbon atoms. Preferably the number average molecular weight of the polymer is from about 1500 to about 10000, preferably from about 1500 to about 3500. The polymers can be prepared by conventional methods of preparing polyesters.

Dibasic acids which can be used in the preparation of these flame retardant polymers include decanoic, pimelic, adipic, azelaic and sebacic acids.

The adhesive can be used in any of the ways described in the prior art (e.g. see U.S. Pat. No. 3,372,148). It can be used to treat paper, aluminum foil, and polyethylene terephthalate copolymers, such as those described in U.S. Pat. Nos. 2,779,684; 2,823,421; 2,968,065; and 2,975,484, and polymer descriptions therein as they relate to polyethylene terephthalate being incorporated herein by reference.

The substrates may be treated on one or both sides by the conventional methods of applying such adhesive solutions to substrates, e.g. by spreading a solution over the surface and allowing to dry. The method of applying the adhesive is not affected by the presence of the polymeric flame retardant.

The treated substrate can then be adhered to other materials, such as aluminum, paper, etc. as taught by the prior art, i.e., any material of which the substrate could be formed.

The present invention offers the advantage of improving the flame resistance of flammable substrates which are treated with the adhesive of the present invention, as well as the flame resistance of materials to which the treated substrates are adhered, without a great sacrifice in adhesion properties.

The amount of flame retardant polymer used with the polyester adhesive resin is dictated by such factors as the compatibility of the flame retardant polymer (FRP) with the adhesive resin, as well as the nature of the solvent selected, it being necessary that the adhesive resin and FRP be mutually soluble in the solvent.

Any inert organic solvent in which the copolyester resin and FRP are mutually soluble can be used, e.g. methyl ethyl ketone and mixtures of methyl ethyl ketone with toluene, and halogen-containing solvents.

In a preferred embodiment, the FRP comprises 10 to 50, preferably 15 to 30 weight percent of the total resin/FRP combination. The preferred solvent is methyl ethyl ketone. The concentration of the copolyester resin/FRP combination in the solvent is preferably 25 to 35 parts by weight of the combination per 100 parts by weight of the solution, i.e. solvent plus the combination. The resin and FRP can be dissolved in the solvent by conventional techniques.

A cast film of the flame retardant adhesive can be somewhat hazy due to the presence of the flame retardant polymer. This haziness can increase as the concentration of flame retardant increases.

Where optical properties are not critical, such as shielding foil tapes, higher concentrations of the flame retardant polymer can be utilized.

Conventional compounding ingredients can be added to the adhesive resin/FRP system, such as non-blocking silicas, silicone wetting agents, and slip agents.

The following example illustrates but does not limit the practice of the present invention.

Unless otherwise indicated, all parts are parts by weight.

EXAMPLE

Solutions containing 30 percent of a copolyester adhesive in methyl ethyl ketone, MEK, were prepared and 3.2, 5.6 and 8.25 weight percent of Emery 9354-A were added. The copolyester had a bound glycol unit ratio of 55/45 ethylene glycol/neopentyl glycol and a bound acid unit ratio of 56/17/27 terephthalic acid/isophthalic acid/azelaic acid. Emery 9354-A is a polymer prepared from 2,2'-bis[4-(2-hydroxyethoxy)-3,5-dibromophenyl] propane and a mixture of dibasic acids. The solution became homogenous after ball milling for 20 minutes. The solids, after evaporating MEK solvent, were tested for flammability by means of OI determination. Glass fabric was utilized to support the resin. The OI value obtained was plotted against bromine contents and found to have linear relationship. The OI value is a limiting oxygen index value and is the amount of oxygen necessary in a nitrogen/oxygen mixture to just maintain burning in a candle-like fashion of a vertically suspended sample. The results are listed below.

| Emery 9354-A Content, % | Br. % | OI |
|---|---|---|
| 0 | 0 | 21.5 |
| 3.2 | 1.25 | 22.5 |
| 5.6 | 2.42 | 23.5 |
| 8.25 | 3.53 | 24.5 |

A solvent adhesive was prepared by combining 27 parts by weight of the above copolyester resin, 3 parts Emery 9354-A resin and 70 part methyl ethyl ketone solvent in a closed container which is agitated for 6 hours. The resultant solution is clear with a viscosity of 220 centipoise. The adhesive solution was cast on one surface of a 92-gauge biaxially-oriented PET film using a Meyer Rod laboratory applicator. The adhesive coating was airdried briefly and force-dried 2 minutes at 100 degrees C. The dried adhesive coating thickness was approximately 0.5 mils thick. The coated PET film was laminated to a 1 mil soft annealed aluminum foil by placing the foil over the coated PET film surface and passing the two plies through a rotary laminator where a single roll was heated to 135 degrees±3 degrees C. The speed was approximately 25 ft. per minute.

Adhesive bond strength of the prepared laminate was determined by separating the two plies in a 180 degree angle of peel on an Instron tensile testor with a separation rate of 2 inches per minute at room temperature. The bond strength of the modified adhesive was found to be equivalent to the unmodified non-halogen containing adhesive alone. The adhesive would improve the flame resistance of the PET film. The coated PET film is adhered to paper. The flame resistance of both the PET film and paper is improved by the presence of the adhesive.

While certain representative embodiments and details have been shown for the purpose of illustrating the invention, it will be apparent to those skilled in the art that various changes and modifications may be made therein without departing from the spirit or scope of the invention.

What is claimed is:

1. A flame retardant adhesive composition comprised of a combination of
   (A) a copolyester adhesive resin consisting of glycol and acid units,
      (1) said glycol units consisting of ethylene glycol units and at least one other glycol unit selected from the group consisting of 1,3-propylene units, cyclohexanedimethylol glycol units, neopentyl glycol units, tetramethylene glycol units and hexamethylene glycol units and
      (2) said acid units consisting of terephthalic acid units and at least one other dicarboxylic acid unit selected from the group consisting of isophthalic acid units, phthalic acid units, adipic acid units, azelaic acid units, sebacic acid units, glutaric acid units and cyclohexane dicarboxylic acid units and
   (B) a flame retardant bromine containing polyester prepared from 2,2'-bis-[4-(2-hydroxyethoxy)-3,5-dibromophenyl] propane and at least one dibasic acid having the structure $R(COOH)_2$ wherein R is an alkyene radical having 4 to 10 and preferably 4 to 7 carbon atoms.

2. A flame retardant adhesive solution comprising an inert organic solvent and the flame retardant adhesive according to claim 1.

3. The flame retardant adhesive of claim 1 wherein the glass transition temperature of the copolyester resin, component (A) is less than 70° C.

* * * * *